J. H. STULL.
DUPLEX CLUTCH.
APPLICATION FILED JAN. 29, 1913.
1,111,681.
Patented Sept. 22, 1914.
2 SHEETS—SHEET 1.
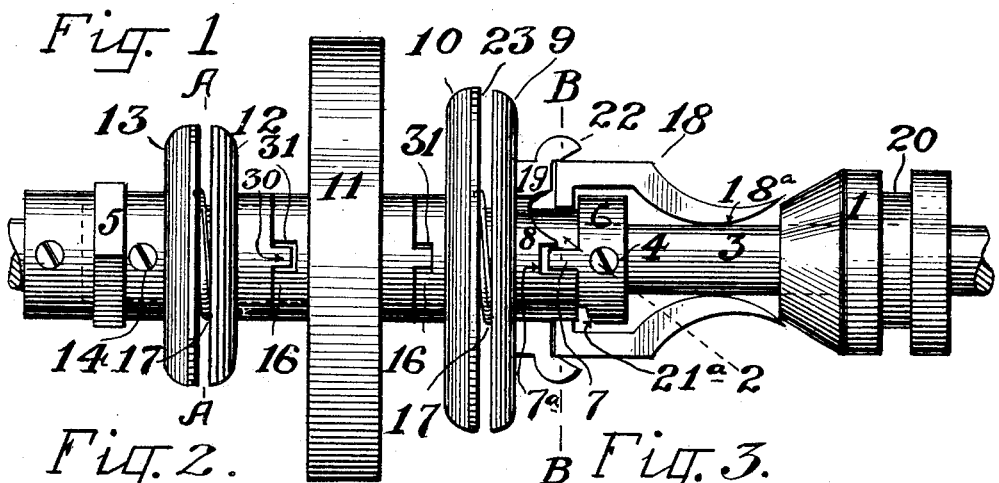
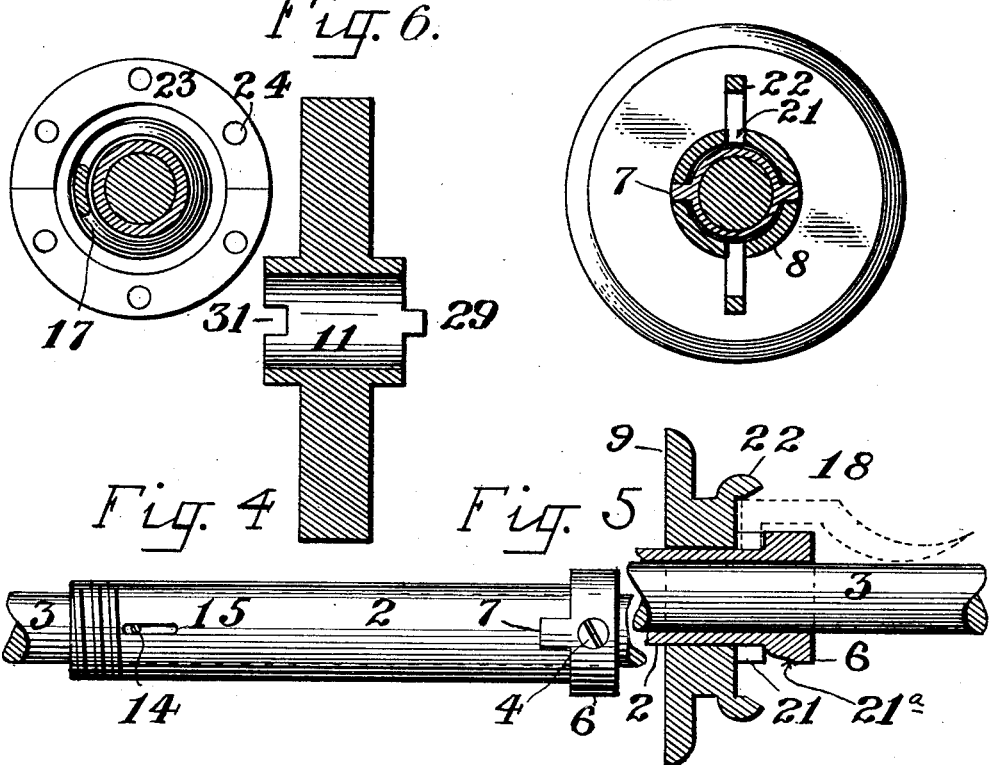
WITNESSES:
Harry Garn
INVENTOR
Jacob H. Stull
BY
Frank J. Tuttle
ATTORNEY J. H. STULL.
DUPLEX CLUTCH.
APPLICATION FILED JAN. 29, 1913.
1,111,681.
Patented Sept. 22, 1914.
2 SHEETS—SHEET 2.
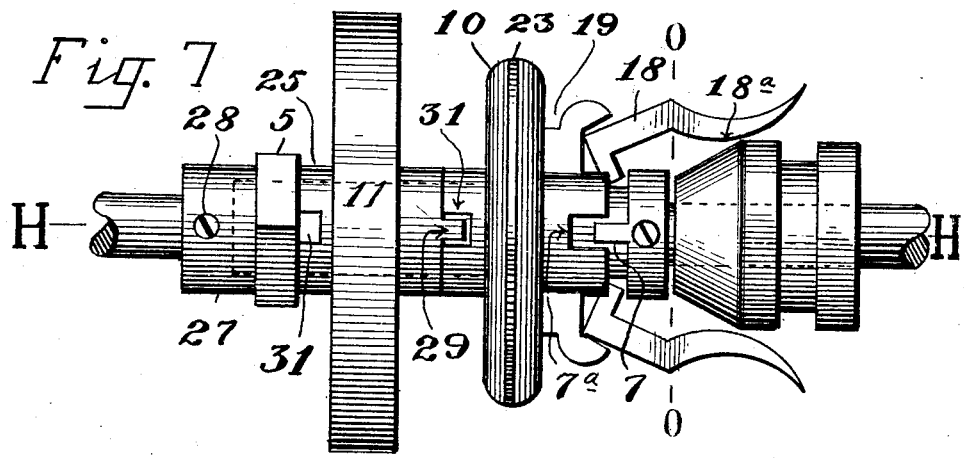
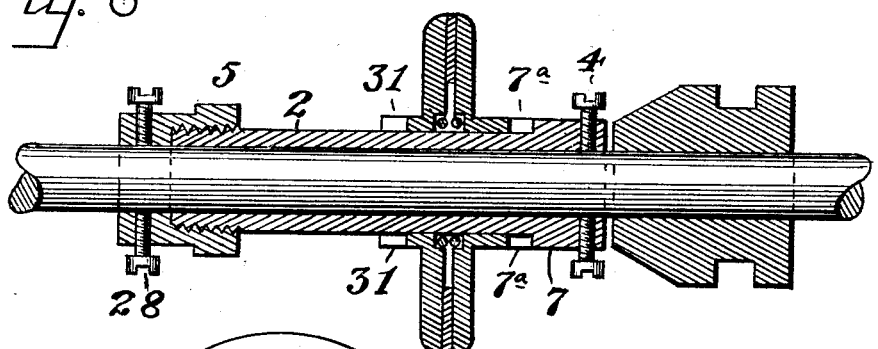
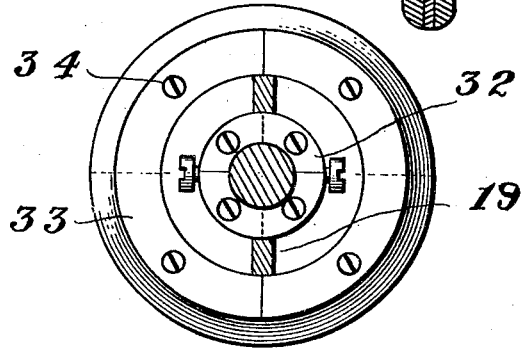
WITNESSES:
Harry Garn
INVENTOR
Jacob H. Stull
Frank J. Tuttle
BY
ATTORNEY

UNITED STATES PATENT OFFICE.

JACOB H. STULL, OF FREMONT, OHIO.

DUPLEX CLUTCH.

1,111,681.  Specification of Letters Patent.  Patented Sept. 22, 1914.

Application filed January 29, 1913. Serial No. 744,863.

*To all whom it may concern:*

Be it known that I, JACOB H. STULL, citizen of the United States, residing at Fremont, in the county of Sandusky and State of Ohio, have invented certain new and useful Improvements in Duplex Clutches, of which the following is a specification.

The principal purpose and object of my invention is to provide a clutch for the holding of loose pulleys such, that while equally as effective as clutches now in common use, nevertheless is constructed with fewer parts and therefore more economical; and further such, that by the addition of additional clutch disks, an increased capacity may be given to the clutch, so as to meet any increase of requirements; all being operated from a single shifting lever. Because of my clutch being so easily adapted to meet such increased requirements I call it a duplex clutch; the added clutch parts forming what I term an auxiliary clutch.

Referring to the drawings which represent the same and are made a part hereof; Figure 1 represents a side view of my invention, a portion of the pulley being omitted; Fig. 2 represents a cross section of Fig. 1 on the line A A, showing one face of the auxiliary clutch; Fig. 3 represents a cross section of Fig. 1 on the line B; Fig. 4 represents in elevation a view of the sleeve, with all of its carried parts being removed therefrom; Fig. 5 represents a fragmentary transverse section of Fig. 1, the front half being cut away; Fig. 6 represents a diametral transverse section of the pulley shown in Fig. 1; Fig. 7 represents a modification of Fig. 1, the auxiliary clutch being omitted, and a modified pulley substituted for the pulley shown in Figs. 1 and 6, the clutch being represented as closed; Fig. 8 represents a transverse section of Fig. 7, along the line H H; and Fig. 9 represents a cross section of Fig. 7 along the line O O, the same being shown as if said clutch were split; some of the parts being cut away farther back so as not to obstruct the view.

Coming now to a more detailed description of my invention, all the parts of my device except the shiftable cone 1 are mounted upon a sleeve 2 which is in turn rigidly secured to and made to turn with the shaft 3, by means of set screws 4, or other suitable means. One end of said sleeve is threaded as shown in Figs. 4 and 8, to engage an adjusting nut 5; while the opposite end is provided with an annular shoulder 6, and oppositely located clutch members 7. Said members are normally made to engage corresponding recesses 7ª, in the end of the hub 8 of the operating disk 9 of my clutch proper, or what I shall now style my principal or major clutch, and thereby cause said disk to turn with the operation of said shaft. The companion disk 10 as well as the pulley 11, and one disk 12 of the auxiliary clutch is normally loose upon said sleeve; while the disk 13, companion to said disk 12, after the parts have been suitably adjusted, is secured to said sleeve and made to turn therewith by means of a set screw 14, or other suitable means. Preferably I construct said sleeve with a slot 15, through which I pass said screw, so that it may have a firm bearing direct upon the shaft. Said pulley 11, normally loose upon said sleeve as stated, is connected upon one side with the disk 10, and oppositely with the disk 12, by means of the jaw clutches 16; so that while all are normally loose, they are made to turn as one piece whenever the disks 9 and 10 become engaged. It may now be understood that the normal position of the respective clutches in my duplex clutch is, open; and their respective companion disks are held apart by suitable resilient means, which in the present case are substantially identical springs, 17. When said clutch is open, said springs being free to operate, said annular shoulder is made to engage the end of said hub 8, as seen in Fig. 1. For the purpose of closing said clutch I provide suitable cam provided bent levers 18, and projecting lugs 19 which project outward from the outer face of the clutch disk 9; one end of said lever being fulcrumed against said shoulder, and the opposite end, provided with said cam, 18ª, being made to coöperate with the face of said cone; the bend in said lever being so located that when said lever is operated the point of the bend will be lifted against the face of one of said lugs. Said cone is provided with an annular groove 20, for coöperation with a shifting yoke. The same being in all respects such as is commonly used for that purpose, it is thought no further description or illustration is required. In order that said bent lever may perform its proper function within a minimum of compass, it may be noticed that I rest the fulcrum end thereof upon the outer perimeter of said sleeve; and therefore, to accommodate that end of said lever I provide said hub 8 with a slot 21, see Figs. 3 and 5. In Fig. 5 a part of the shoulder 6 is broken away at 21ᵃ to show said slot more clearly.

It has already been stated that the disk 9 is made to operate by the rotation of the shaft 3; and therefore in order that said lever may not fall behind, and thus rendered inoperative, it is obvious that suitable means should be provided so that said lever may be carried around with said disk. Preferable, if not from necessity, I make said slot to contribute toward performing that additional function. In addition thereto, and in order that said lever may not be lost by reason of centrifugal force, I provide said lug 19 with a suitable finger 22, which I locate in suitable proximity thereto, and which serves as a keeper for said lever. And further so that said levers may not be lost, I make the length and depth-capacity of said clutch members, 7 and 7ᵃ, to exceed any permissible lateral movement of said disk 9; whereby the same, while free to slide, is at all times made to turn with the operation of said shaft, and in consequence said keepers 22 are made to perform their appointed duty. Said slot may be understood from Fig. 1 when seen in connection with Fig. 3; but it is more clearly shown in Fig. 5 where it is occupied by the extreme end of the shorter arm of said lever, as shown in dotted outline. Oppositely said slot is shown vacant.

For frictional purposes it may now be explained, that one of the disks, in each of the respective clutches, major and auxiliary, is faced with a suitable material 23: which for convenience I cut in segments, and which I secure to said disks by suitable means, as by a flat headed rivet or pin 24, see Fig. 2.

It has already been stated that the companion disks in each of the respective clutches, major and auxiliary, are held apart by a substantially identical spring 17. In Fig. 2 said spring is seen cut in cross section of the shaft 3. The mechanic will understand that said spring must be seated in a suitable recess cut in said disks; and in the drawings, though the same is not shown, it will be understood that said recess is occupied by said spring. In my duplex clutch, it has already been stated that the disk 13 is secured upon the sleeve 2, and made to turn therewith by means of the set screws 14; and when the position of said disk is adjusted by means of the adjusting nut 5, no further or other fastening is required. But in case of my modified clutch, as shown in Fig. 7, in order that said nut may not be moved by frictional contact with the hub 25, I provide said nut with a reduced extension 27, which I secure to the shaft 3 by means of a set screw 28, as shown more clearly in Fig. 8.

The jaw clutches 16, by means of which the pulley 11 is connected with the disks 10 and 12, may be more clearly understood by referring to Figs. 1, 6, and 7; the clutch members 29 and 30 being made to engage substantially identical recesses 31.

It is a matter of common knowledge that clutches frequently have to be installed where it would be inconvenient to dismantle the shaft; and therefore to accommodate such uses a split clutch must be provided. In the drawings Fig. 9 represents such a clutch. In this case the sleeve 2 and the disk 9 are supposed to be cut upon the dotted lines; and then respectively secured together by plates 32 and 33, which are cut upon the full lines; the several parts then being suitably secured together, each in their proper place by screws 34. Similarly as any mechanic would suggest, each of the remaining parts of said clutch may be split and mounted as required.

Referring to the sleeve 2 it may now be observed that in the drawings I have shown the same as if the sleeve proper, and the annular shoulder 6 together with the clutch member 7, were integral with each other; as if molded or formed in a single piece. In practice this may be so; but if preferred, said shoulder and clutch member may be of a separate construction and the same made to be carried by said sleeve as any mechanic would suggest. From preference however, I construct them as shown in the drawing, being in consequence thereof able to use a lighter material for the sleeve. In connection herewith, and since I have indifferently called the part " 6 ", both a " shoulder ", and an " annular shoulder ", it should now be explained, that in order to render the operation of said lever 18 effective, a shoulder, only, is required. But in order that I may be permitted to use such lighter material, I reinforce the same by making said part " 6 " to embrace said sleeve, similarly as a band or collar, and thus make it to perform a double service, both as a shoulder, and a reinforcement.

Referring to the clutch 16, between the disk 10, and the pulley 11, it may now be observed that the purpose of that clutch is not so much to prevent the two parts from turning independent of each other, as to afford means by which said pulley may be driven when said disks 9 and 10 are made to clutch; and the further purpose thereof is to give to said pulley a power which may be wholly incommensurate with its diameter, or the extent of its friction surface; and thereby, with the same motive power, give either a high or low belt velocity, using either large or small pulleys as may be desired.

Having now fully described my invention, what I claim as new is:

1. A duplex clutch comprising: an operating shaft; a sleeve mounted thereon and made to turn therewith; an annular shoulder for said sleeve at one end, and a screw threaded adjusting nut for the other end; a friction clutch disk slidable upon said sleeve, with slotted hub therefor, and jaw clutch connections between the same and said shoulder which cause said disk to turn as said sleeve is made to operate; a second friction clutch disk contiguous to said nut with securing means therefor whereby the same may be fixed upon said sleeve when in suitable position; substantially identical springs, one for each such disk mounted upon said sleeve; additional clutch disks, one companion for each of the previously mentioned disks, and a driving pulley, all loose upon said sleeve, together with jaw clutch connections upon each side of said pulley and between the same and its adjacent disk, whereby all said parts are locked together and made to turn as a single piece; suitable lugs, which are oppositely mounted upon the outer perimeter of said hub; a shiftable cone mounted upon said shaft, and a cam provided bent lever, one for each such lug, the shorter arm of which operates in said slot and is made to fulcrum against said shoulder, while the cam of the other arm coöperates with said cone to lift against the outer face of said lug, whereby as said cone is operated, said springs are compressed and both said clutches are closed, together with suitable keepers for each such lever which guard against the action of centrifugal force; all in combination, and substantially as set forth.

2. In a device of the character described, the combination of a shaft; a sleeve fixed thereupon, one end of which is provided with a shoulder at two diametrically opposite points, and a screw threaded adjusting nut for the opposite end thereof, together with means for holding said nut in place; a hubbed friction disk, slidably connected with said sleeve, the hub of which, at two diametrically opposite points, is provided with a slot, and a coöperating retaining lug; a shiftable cone, loose upon said shaft; a pair of cam provided bent levers, one for each such slot and lug, for the operation of said disk; said slots being made to receive one end of said lever, and said levers being so formed, that while said end is fulcrumed against said shoulder, the opposite end thereof is made to operate by engagement of said cam with the face of said cone, the point of the bend being made to lift against the face of its retaining lug; a second disk for coöperation with said first named disk, and a pulley adjacent to said nut, both loose upon said sleeve, together with engaging means between said second disk and said pulley, for the operation thereof.

3. In a construction of the sort described the combination of a shaft, a sleeve fixed thereon, one end of which is provided with a shoulder at two diametrically opposite points; a shiftable cone loose upon said shaft; a hubbed friction disk slidably connected to said sleeve, and a pair of bent levers for the operation thereof; said hub being oppositely provided with retaining lugs, and slots, one such lug and slot for each such lever; said slots being made to receive one end of said lever, and said lever being so formed, that while said end is fulcrumed against said shoulder, the opposite end thereof is made to operate by engagement with the face of said cone, and said lever, at the point of the bend, is made to engage and lift against the face of said retaining lug, whereby said disk is operated.

4. In a construction of the sort described, the combination of a shaft; a sleeve fixed thereon; one end of which is provided with a shoulder at two diametrically opposite points; a shiftable cone, loose upon said shaft; a hubbed friction disk, slidably connected to said sleeve, and a coöperating friction member loose thereon, together with a pair of cam provided bent levers for the operation of said hubbed disk; said hub being oppositely provided with retaining lugs and slots, one such lug and slot for each such lever; said slots being made to receive one end of said lever, and said lever being so formed, that while said end is fulcrumed against said shoulder, the opposite end thereof is made to operate by engagement of said cam with the face of said cone, said lever at the point of the bend, being made to engage and lift against the face of said retaining lug; all substantially as set forth.

In testimony whereof I affix my signature in presence of two witnesses.

JACOB H. STULL.

Witnesses:
FRANK J. TUTTLE,
C. B. CARR.

---

Copies of this patent may be obtained for five cents each, by addressing the "Commissioner of Patents, Washington, D. C."